(12) United States Patent
Ueda et al.

(10) Patent No.: US 7,597,974 B2
(45) Date of Patent: Oct. 6, 2009

(54) FUEL CELL SYSTEM

(75) Inventors: Kenichiro Ueda, Saitama (JP); Tomoki Kobayashi, Saitama (JP); Shigeru Inai, Saitama (JP); Minoru Uoshima, Saitama (JP); Yasunori Kotani, Saitama (JP); Yoshikazu Murakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 11/106,882

(22) Filed: Apr. 14, 2005

(65) Prior Publication Data

US 2005/0255346 A1    Nov. 17, 2005

(30) Foreign Application Priority Data

Apr. 14, 2004   (JP) .............................. 2004-119429

(51) Int. Cl.
  *H01M 8/00* (2006.01)
  *H01M 8/04* (2006.01)
  *H01M 8/12* (2006.01)

(52) U.S. Cl. .............................. 429/13; 429/22; 429/24; 429/25

(58) Field of Classification Search .................. 429/13, 429/22, 24, 25
  See application file for complete search history.

(56) References Cited

U.S. PATENT DOCUMENTS

| | | | |
|---|---|---|---|
| 2001/0008718 A1* | 7/2001 | Kobayashi | 429/9 |
| 2001/0010872 A1* | 8/2001 | Suzuki et al. | 429/12 |
| 2002/0098393 A1* | 7/2002 | Dine et al. | 429/13 |
| 2003/0118876 A1* | 6/2003 | Sugiura et al. | 429/9 |
| 2004/0175598 A1* | 9/2004 | Bliven et al. | 429/12 |
| 2005/0136304 A1* | 6/2005 | Pettit et al. | 429/26 |

FOREIGN PATENT DOCUMENTS

JP    2003-331893    11/2003

* cited by examiner

*Primary Examiner*—Patrick Ryan
*Assistant Examiner*—Eugenia Wang
(74) *Attorney, Agent, or Firm*—Lahive & Cockfield, LLP; Anthony A. Laurentano

(57) ABSTRACT

The fuel cell system is equipped with a fuel cell for generating power by a reaction of fuel and oxidizer gases, a fuel gas flow passage for passing the fuel gas, an oxidizer gas flow passage for passing the oxidizer gas, a sweeping gas supply mechanism for sweeping any of the fuel and oxidizer gas flow passages by a sweeping gas, a sweeping determination mechanism for determining whether to perform sweeping by the sweeping gas supply mechanism, when receiving a stop request for stopping the fuel cell system, a pressure reduction mechanism for reducing a pressure within one of the flow passages lower than when determined not to perform the sweeping, when determined to perform the sweeping by the sweeping determination mechanism, and an actuation mechanism for actuating the sweeping gas supply mechanism after the pressure within the flow passage is reduced by the pressure reduction mechanism.

4 Claims, 8 Drawing Sheets

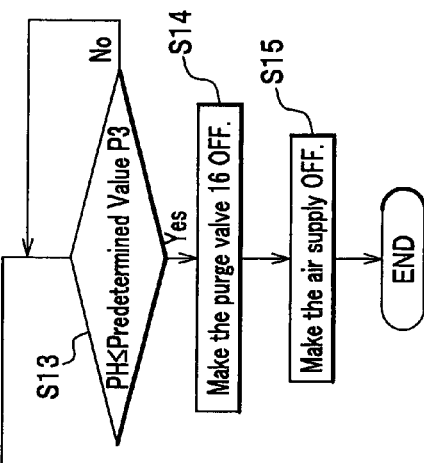
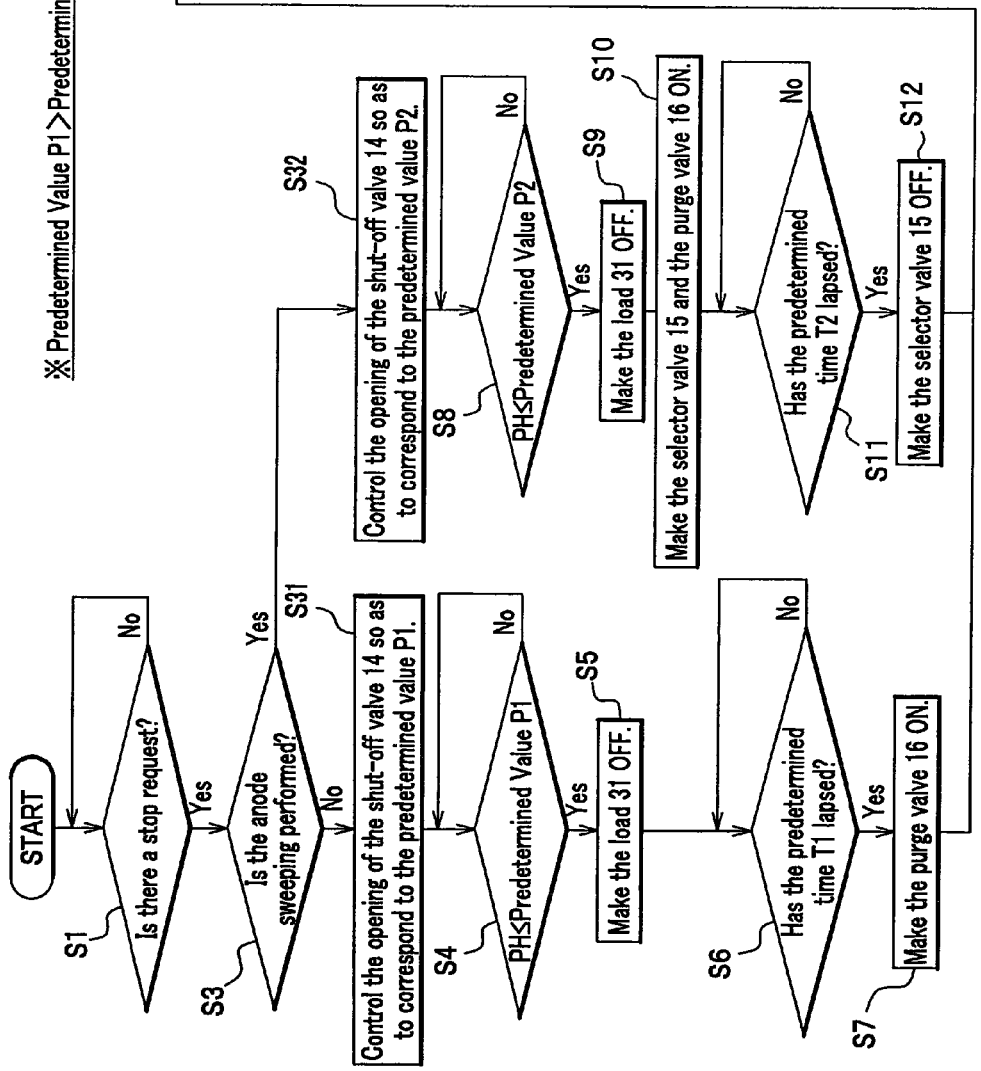

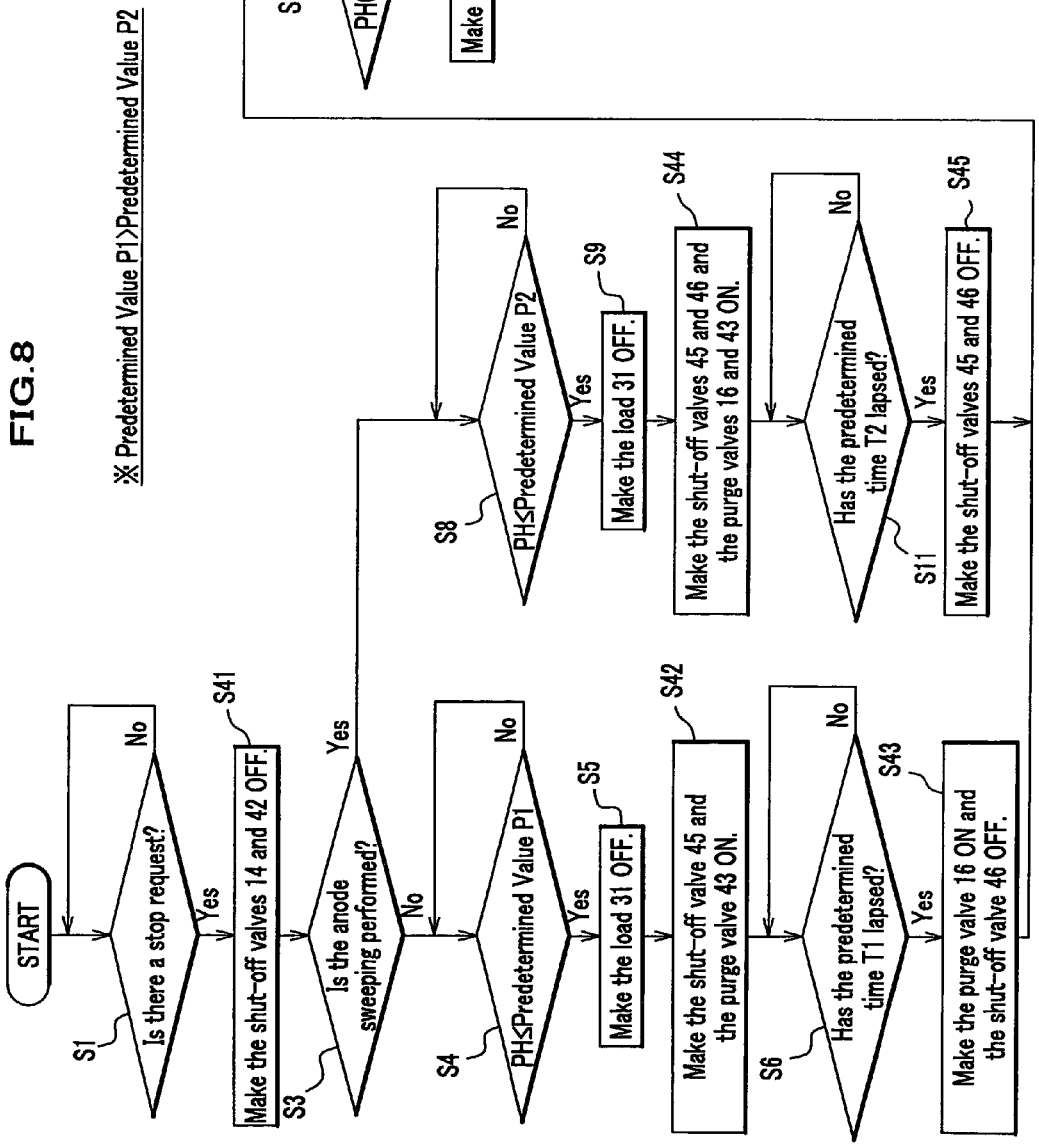

FUEL CELL SYSTEM

BACKGROUND OF THE INVENTION

1. Field of the Invention

The present invention relates to a fuel cell system for purging water and the like within an anode loop by air and the like.

2. Description of the Related Art

Generally, a fuel cell is configured by comparting a cathode at one side and an anode at the other side with sandwiching a proton conductive polymer electrolyte membrane (PEM) and generates power by an electrochemical reaction of oxygen in the air supplied to the cathode and hydrogen supplied to the anode. And in such a fuel cell system with such the fuel cell, if because water is produced by the electrochemical reaction of oxygen and hydrogen, the fuel cell is stopped in a state that the water stays within the system as it is and long time lapses from a power generation stop, there is a possibility that the water freezes in winter and a cold district.

As a technology for such the problem is conventionally known one that purges water and the like remaining within a cathode loop and an anode loop by branching air sent out of a compressor and supplying it within the cathode loop and the anode loop in a stop of a fuel cell system (see paragraphs 0022 to 0024 and FIG. 1 of Japanese Patent Laid-Open Publication No. 2003-331893). Meanwhile, in a description below a process of purging water and the like within the anode loop by a gas such as air other than a hydrogen gas is referred to as "anode sweeping process."

However, the conventional technology performs the anode sweeping process just after there occurs a stop request for stopping a fuel cell system, and therefore, when a pressure within the anode loop becomes a comparatively higher state (state of a comparatively many hydrogen gas remaining) than an atmospheric pressure in the stop of the fuel cell system, there is a possibility that a hydrogen gas and air for sweeping react within the same loop, and in this case there is a possibility that a membrane of the fuel cell is deteriorated.

Consequently, a fuel cell system is strongly requested that can prevent a deterioration of a membrane accompanied with the anode sweeping process.

SUMMARY OF THE INVENTION

A first aspect of the present invention to solve the problem described above is a fuel cell system that comprises a fuel cell for generating power by a reaction of a fuel gas and an oxidizer gas; a fuel gas flow passage for passing the fuel gas, an oxidizer gas flow passage for passing the oxidizer gas; a sweeping gas supply mechanism for sweeping any of the fuel gas flow passage and the oxidizer gas flow passage by a sweeping gas; a sweeping determination mechanism for determining whether or not to perform the sweeping by the sweeping gas supply mechanism, when receiving a stop request for stopping the fuel cell system; a pressure reduction mechanism for reducing a pressure within one of the flow passages where the sweeping is performed when determined to perform the sweeping by the sweeping determination mechanism lower than when determined not to perform the sweeping; and an actuation mechanism for actuating the sweeping gas supply mechanism after the pressure within the flow passage is reduced by the pressure reduction mechanism.

In accordance with the first aspect of the present invention, if receiving the stop request, the sweeping determination mechanism determines whether or not to perform the sweeping by the sweeping gas supply mechanism. And if determining to perform the sweeping by the sweeping determination mechanism, for example, the pressure within the fuel gas flow passage is reduced to a pressure lower than when the sweeping is not performed, and then the sweeping gas supply mechanism is actuated and sweeping an inside of the fuel gas flow passage is performed by the actuation mechanism. In other words, the pressure reduction mechanism reduces, for example, the pressure within the fuel gas flow passage in the sweeping, and thereby a fuel gas amount remaining within the fuel gas flow passage becomes less: therefore a reaction of the fuel gas and the sweeping gas is prevented within an anode loop, and thus a membrane deterioration of the fuel cell can be prevented.

A second aspect of the present invention is the fuel cell system of the first aspect, and the pressure reduction mechanism reduces a pressure within the flow passage by continuing an operation of the fuel cell after a stop request so that a power generation amount becomes more than when the sweeping determination mechanism determines not to perform sweeping.

Here as a method of increasing the power generation amount can be cited, for example, a method of increasing the power generation amount by lengthening time from a stop request to an actual fuel cell stop; a method of increasing the power generation amount by increasing a current picked up from the fuel cell after the stop request; and the like.

In accordance with the second aspect of the present invention, if the sweeping determination mechanism determines to perform the sweeping, the operation of the fuel cell is continued after the stop request so that the power generation amount becomes more by the pressure reduction mechanism than when the sweeping determination mechanism determines not to perform the sweeping. In other words, because sweeping the fuel cell results in consuming, for example, more fuel gas within the fuel gas flow passage, a waste of the fuel gas can be prevented.

A third aspect of the present invention is the fuel cell system of any of the first and second aspects that comprises a pressure detection mechanism for detecting a pressure within one of the flow passages where sweeping is performed, wherein the pressure reduction mechanism adjusts the pressure within the flow passage, based on a signal from the pressure detection mechanism.

In accordance with the third aspect of the present invention, because a remaining amount of a fuel gas within a fuel gas flow passage can be accurately controlled by monitoring, for example, the pressure within the fuel gas flow passage by the pressure detection mechanism, a fuel gas amount discharged outside by the sweeping can be further lessened.

A fourth aspect of the present invention is the fuel cell system of any of the first to third aspects, the sweeping gas is the oxidizer gas, and the sweeping gas supply mechanism sweeps the fuel gas flow passage with the oxidizer gas.

In accordance with the fourth aspect of the present invention, because the sweeping gas supply mechanism can be used as an apparatus for supplying the oxidizer gas to a fuel cell, it becomes unnecessary to separately provide an apparatus for sweeping and one for supplying the oxidizer gas, and thereby the system can be downsized.

BRIEF DESCRIPTION OF THE DRAWINGS

FIG. 6 is a flowchart showing a variation example of the first embodiment.

FIG. 8 is a flowchart showing an operation of a control unit of FIG. 7.

DESCRIPTION OF THE PREFERRED EMBODIMENTS

First Embodiment

Next will be described an embodiment of the present invention in detail, referring to drawings as needed.

Figure 1:
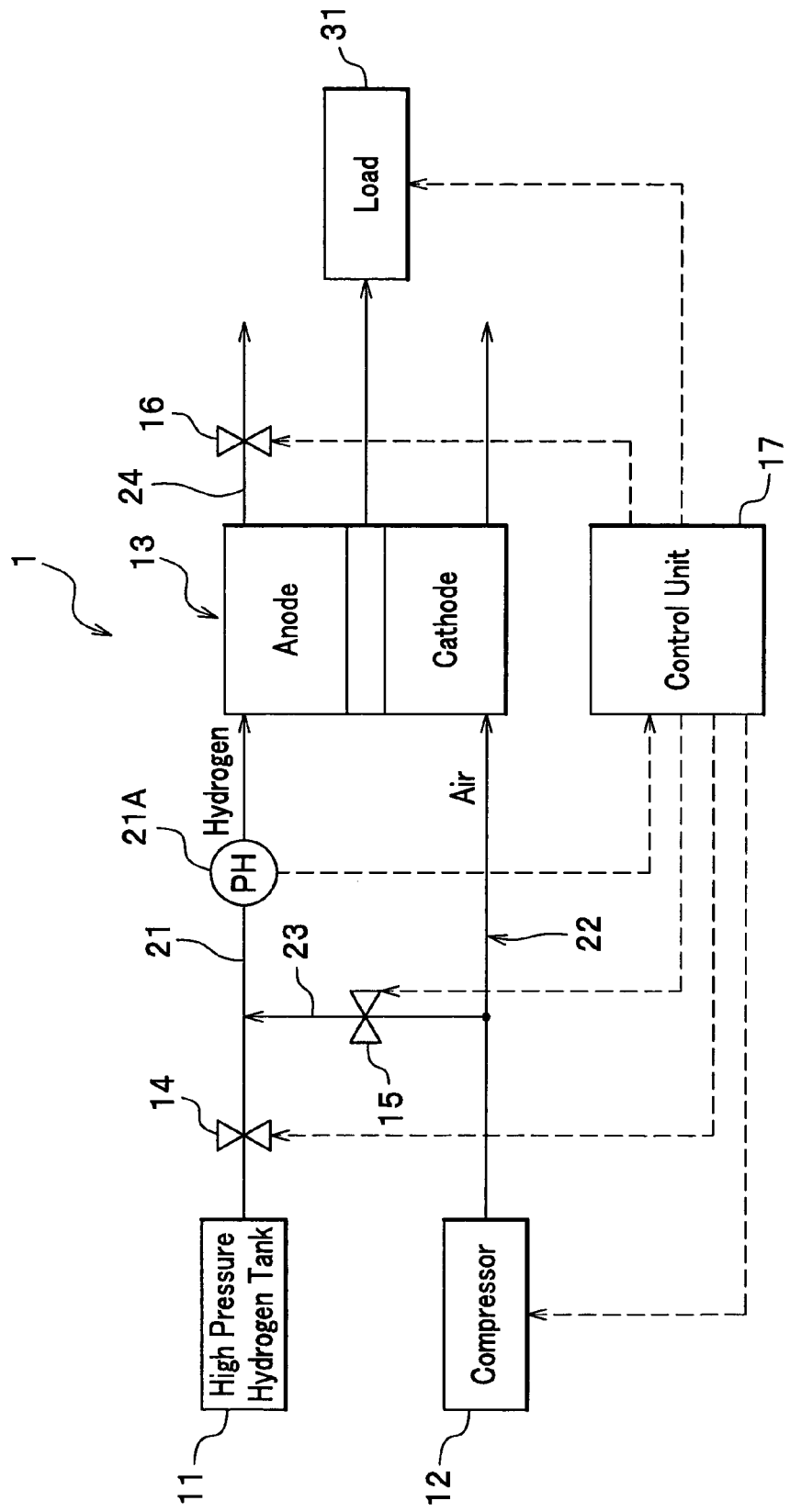
FIG. 1 is a configuration diagram showing a fuel cell system related to a first embodiment of the present invention.

As shown in FIG. 1, a fuel cell system 1 is mainly equipped with a high pressure hydrogen tank 11, a compressor 12, a fuel cell 13, a shut-off valve 14, a selector valve 15, a purge valve 16, and a control unit 17.

Within the high pressure hydrogen tank 11 is reserved a hydrogen gas (fuel gas) of a high pressure of several tens MPa, and the hydrogen gas is designed to be supplied to the fuel cell 13 by the shut-off valve's 14 being opened. Meanwhile, between the high pressure hydrogen tank 11 and the fuel cell 13 is provided a tubular fuel gas supply passage (fuel gas flow passage) 21 that becomes a hydrogen gas passage; and at the fuel gas flow passage 21, from a side of the high pressure hydrogen tank 11 to that of the fuel cell 13 in order, are provided the shut-off valve 14 and a pressure sensor (pressure detection mechanism) 21A. Meanwhile, the pressure sensor 21A always detects a pressure within the fuel gas flow passage 21 and outputs a signal indicating a pressure value thereof to the control unit 17.

The compressor 12 compresses air (oxidizer gas) and supplies it to the fuel cell 13. And between the compressor 12 and the fuel cell 13 is provided a tubular air supply passage (oxidizer gas low passage) 22 that becomes an air passage.

The fuel cell 13 generates power by electrochemically reacting a hydrogen gas supplied from the high pressure hydrogen tank 11 and air supplied from the compressor 12. In addition, to the fuel cell 13 is connected a load 31 such as a motor consuming electric power generated by the fuel cell 13, the load 31 is made ON/OFF by the control unit 17, and thus the fuel cell 13 is operated/stopped: in other words, a pick-up of a current from the fuel cell 13 is designed to be made ON/OFF (execution/stop).

The shut-off valve 14 changes a supply/stop of a hydrogen gas from the high pressure hydrogen tank 11 to the fuel cell 13 and is designed so that a solenoid coil not shown is excited by an activation current's (ON signal) being supplied from the control unit 17 and to be opened by a movable plunger's, which is not shown and is always energized in a close direction by a spring through magnetic force, being attracted with strong force.

The selector valve 15 is appropriately opened/closed by the control unit 17 and is provided at a sweeping flow passage 23 connected so as to be across a downstream side of the shut-off valve 14 and the air supply passage 22 in the fuel gas supply passage 21. And in a state of the selector valve's 15 being closed the air from the compressor 12 is designed to be supplied to nothing but a cathode side of the fuel cell 13 through the air supply passage 22; in a state of the selector valve's 15 being opened the air from the compressor 12 is designed to be supplied to the cathode side of the fuel cell 13 and further to an anode side of the fuel cell 13 through the sweeping flow passage 23 and the fuel gas supply passage 21.

The purge valve 16 is appropriately opened/closed by the control unit 17 and is provided at a fuel gas discharge passage (fuel gas flow passage) 24 connected to an outlet of the anode side of the fuel cell 13. And sweeping the anode side is designed to be performed by opening the purge valve 16 and the selector valve 15 together.

When receiving a stop request of the system output by, for example, a driver's making an ignition switch OFF and the like, the control unit 17 has a function of determining whether or not to sweep insides of the fuel gas supply passage 21, a passage (not shown) formed within the fuel cell 13, and the fuel gas discharge passage 24 (hereinafter, these are simply referred to as "anode loop"). Meanwhile, to be more precise, a determination of whether or not to perform the sweeping can be performed by determining whether or not an outside air temperature detected, for example, by a temperature sensor is not more than a predetermined value (whether or not there is a possibility of water remaining within the passages freezing).

In addition, when determining to perform the sweeping, the control unit 17 has a function of reducing a pressure within the anode loop detected by the pressure sensor 21A to a pressure lower than when determining not to perform the sweeping by continuing an operation of the fuel cell 13 after a stop request so that a power generation amount becomes more than when determining not to perform the sweeping. Here as a method of operating the fuel cell 13 so that the power generation amount becomes more, although there are a method of lengthening operation time of the fuel cell 13, a method of increasing a current picked up out of the fuel cell 13, and the like, it is assumed that the embodiment adopts the method of lengthening the operation time.

Furthermore, after operating the fuel cell 13 longer than when the sweeping is not performed as described above, the control unit 17 has a function of opening the purge valve 16 and the selector valve 15. Meanwhile, the control unit 17 also has functions similar to conventional ones such as the ones of opening/closing the shut-off valve 14, making the load 31 ON/OFF, changing a rotation speed of the compressor 12, and the like in addition to the functions described above.

Here will be described an operation of the control unit 17, referring to a flow shown in FIG. 2 and FIG. 1.

Figure 2:
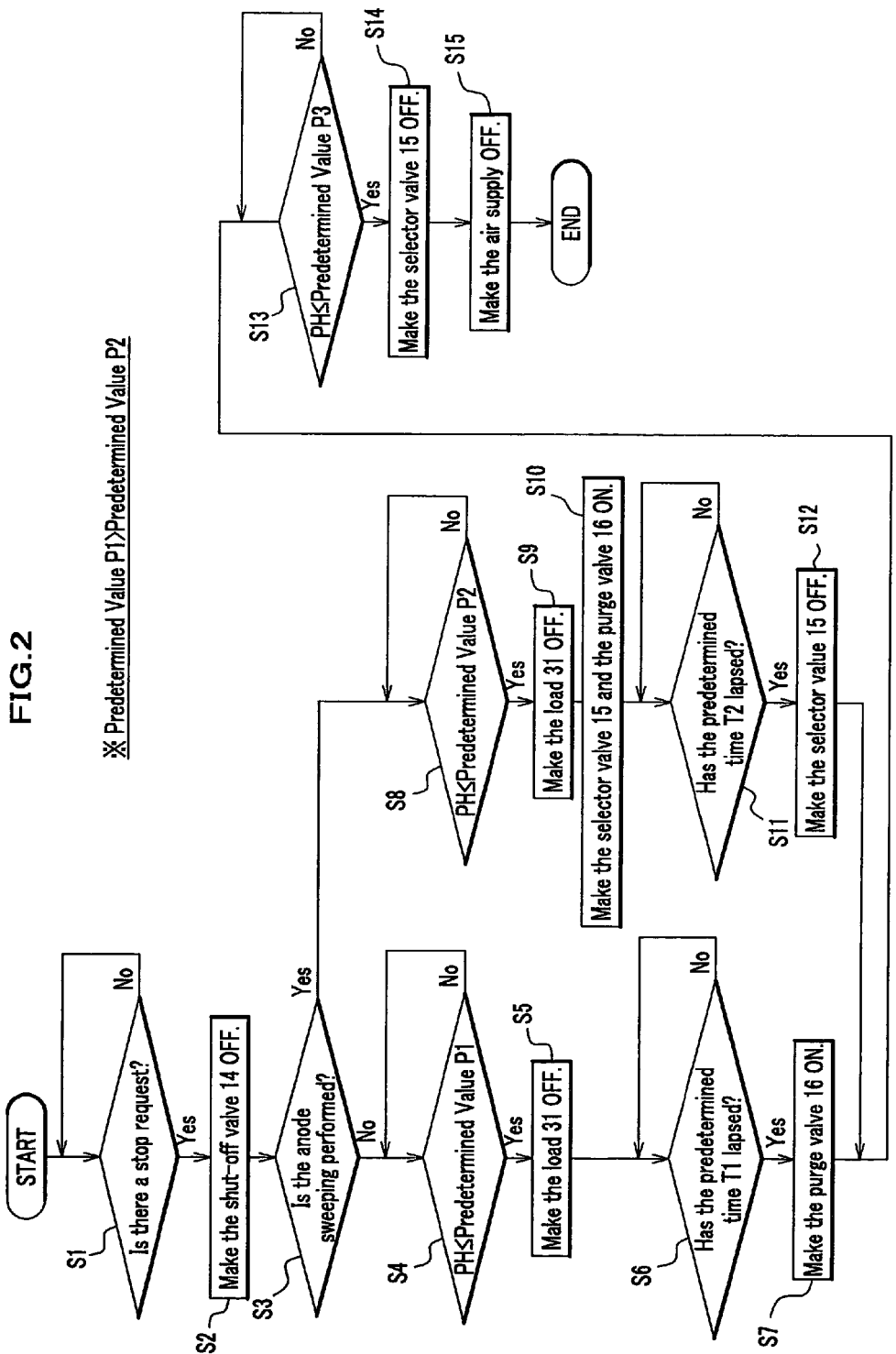
FIG. 2 is a flowchart showing an operation of a control unit of FIG. 1.

As shown in FIG. 2, the control unit 17 always determines whether or not a stop request is output (step S1) and again repeats the determination of the step S1, if determining that the stop request is not output (No). In addition, if determining that the stop request is output in the step S1 (Yes), the control unit 17 closes the shut-off valve 14 (step S2) and stops a hydrogen gas supply to the fuel cell 13 from the high pressure hydrogen tank 11.

Subsequently, the control unit 17 determines whether or not to perform sweeping within the anode loop (step S3), and if determining not to perform the sweeping (No), the control unit 17 determines whether or not a pressure PH within the anode loop is not more than a predetermined value P1 (step S4). In the step S4, if determining that the pressure PH within the anode loop is more than the predetermined value P1, the control unit 17 again repeats the processing of the step S4.

In the step S4, if determining that the pressure PH within the anode loop is not more than the predetermined value P1 (Yes), the control unit 17 makes the load 31 OFF (step S5) and thereby stops the power generation by the fuel cell 13. After the step S5 the control unit 17 determines whether or not a predetermined time T1 has lapsed (step S6) and thereby determines whether or not sweeping of a cathode side completes by the compressor 12 still continuing an operation.

In the step S6, if determining that the predetermined time T1 has not lapsed (No), the control unit 17 again repeats the processing-of the step S6. In addition, in the step S6, if determining that the predetermined time T1 has lapsed (Yes), the control unit 17 opens the purge valve 16 (step S7) and thereby uses a remaining pressure (predetermined value P1) of a hydrogen gas within the anode loop, and discharges an impure gas (nitrogen gas and the like) within the anode loop outside.

In addition, in the step S3, if determining to perform the sweeping (Yes), the control unit 17 determines whether or not the pressure PH within the anode loop is not more than a predetermined value P2, which is lower than the predetermined value P1 (step S8). In the step S8, if determining the pressure PH is more than the predetermined value P2 (No), the control unit 17 again repeats the processing-of the step S8.

In the step S8, if determining the pressure PH is not more than the predetermined value P2 (Yes), the control unit 17 makes the load 31 OFF (step S9) and thereby stops the power generation by the fuel cell 13. After the step S9 the control unit 17 opens the selector valve 15 and the purge valve 16 together (step S10) and thereby supplies air from the compressor 12 to both of the anode loop and a cathode loop. Thus these loops result in being swept together.

After the step S10 the control unit 17 determines whether or not a predetermined time T2 has lapsed (step S11) and thereby determines whether or not the sweeping of the anode loop and the cathode loop completes. In the step S11, if determining that the predetermined time T2 has not lapsed (No), the control unit 17 again repeats the processing-of the step S11. In addition, in the step S11, if determining that the predetermined time T2 has lapsed (Yes), the control unit 17 closes the selector valve 15 (step S12) and thereby stops the air supply to the anode loop from the compressor 12.

And after the step S12 and the step S7, the control unit 17 determines whether or not the pressure PH within the anode loop is not more than a predetermined value P3, which becomes a lower value than the predetermined values P1 and P2 and a higher value than an atmospheric pressure (step S13). In the step S13, if determining that the pressure PH is more than the predetermined value P3 (No), the control unit 17 again repeats the processing-of the step S13. In addition, in the step S13, if determining that the pressure PH is not more than the predetermined value P3 (Yes), the control unit 17 closes the purge valve 16 (step S14), then stops the air supply by the compressor 12 (step S15), and ends the operation according to the flow.

Next will be described a stop method of the fuel cell system 1 of the first embodiment, referring to in FIGS. 3 and 4.

Firstly will be described a stop method of the fuel cell system 1 at normal time, that is, a stop method in a case of not sweeping the inside of the anode loop (processings of the steps S1-S7 and S13-S15 of FIG. 2).

Figure 3:
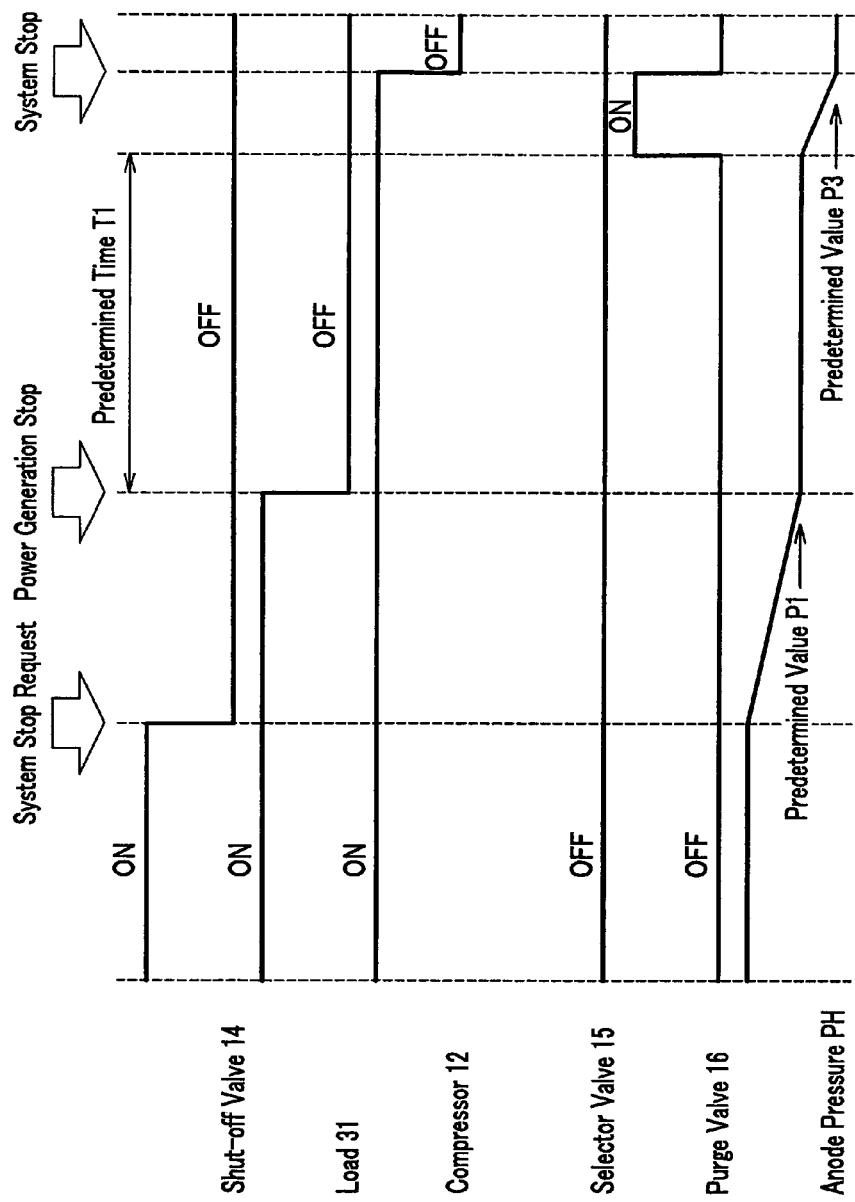
FIG. 3 is a time chart showing a stop method when an inside of an anode loop is not swept.

As shown in FIG. 3, if a stop request is output by a driver's making an ignition switch OFF and the like, the control unit 17 makes the shut-off valve 14 OFF and continues the operation of the load 31 of the fuel cell 13, that is, the power generation by the fuel cell 13 until the pressure PH within the anode loop becomes the predetermined value P1.

If the pressure PH within the anode loop reaches the predetermined value P1, the load 31 is made OFF, the operation of the fuel cell 13 stops, and the cathode loop results in being swept by the compressor 12 for a period from the stop of the fuel cell 13 to the predetermined time T1. And if the predetermined time T1 lapses, the purge valve 16 is opened, a purge of a impure gas and the like remaining within the anode loop is started; and if the pressure PH within the anode loop becomes the predetermined value P3, the purge valve 16 is closed, the operation of the compressor 12 is stopped, and thus the fuel cell system 1 results in stopping.

Subsequently, a stop method (processings of the steps S1-S3 and S8-S15 of FIG. 2) of the fuel cell system 1 will be described in a case of sweeping the anode loop.

Figure 4:
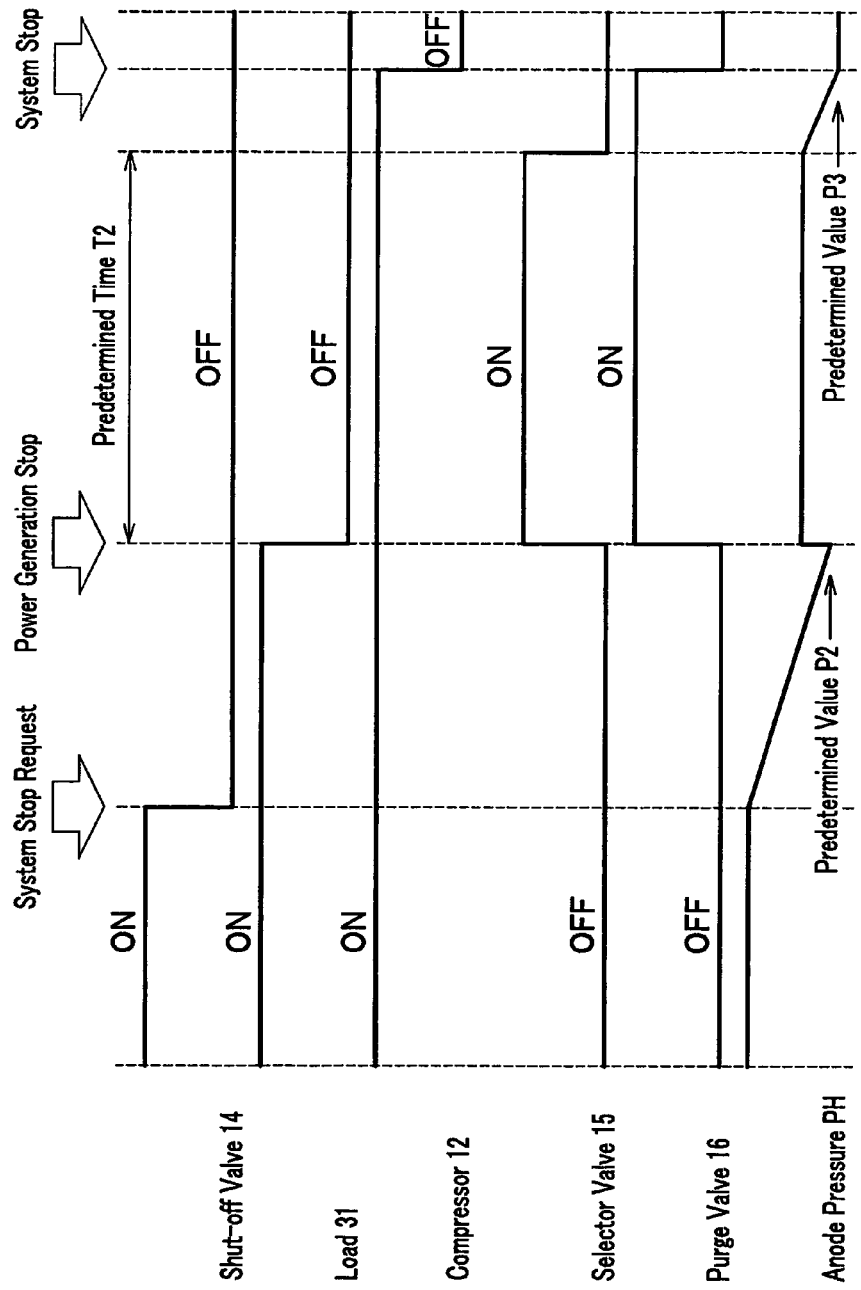
FIG. 4 is a time chart showing a stop method when an inside of an anode loop is swept.

As shown in FIG. 4, if a stop request is output by a driver's making an ignition switch OFF and the like, the control unit 17 makes the shut-off valve 14 OFF and continues the operation of the load 31 of the fuel cell 13 until the pressure PH within the anode loop becomes the predetermined value P2, which is a value lower than the predetermined value P1 of a case of the sweeping being not performed.

If the pressure PH within the anode loop reaches the predetermined value P2, the load 31 is made OFF, the operation of the fuel cell 13 stops, the selector valve 15 and the purge valve 16 are opened, and thus the insides of the anode loop and the cathode loop result in being swept by the compressor 12. And if the predetermined time T2 lapses, the selector valve 15 is closed, the sweeping of the inside of the anode loop by the compressor 12 ends, and the pressure PH within the anode loop temporarily heightened by the compressor 12 results in being gradually reduced. After then, if the pressure PH within the anode loop becomes the predetermined value P3, the purge valve 16 is closed, the operation of the compressor 12 is stopped, and thus the fuel cell system 1 results in stopping.

Thus in accordance with the first embodiment can be obtained following effects:

Because the pressure PH within the anode loop can be reduced by the control unit 17 to the predetermined value P2 of a pressure lower than a case of not being swept, a hydrogen gas amount remaining within the anode loop becomes less, a reaction of the hydrogen gas and air within the anode loop is prevented, and thus a membrane deterioration of the fuel cell 13 can be prevented. In addition, because a method of consuming a hydrogen gas within the anode loop by the fuel cell 13 is adopted as a method of reducing a pressure within the anode loop, a waste of the hydrogen gas can also be prevented.

Because a remaining amount of a hydrogen gas within the anode loop can be accurately controlled by monitoring the pressure PH within the anode loop by the pressure sensor 21A, a hydrogen gas amount discharged outside by sweeping can be made less.

Because the compressor 12 for supplying air to the fuel cell 13 is used as a sweeping gas supply mechanism, it becomes unnecessary to provide another apparatus as one for sweeping and thereby the system can be downsized.

Meanwhile, the present invention can be performed in various embodiments without being limited to the embodiment.

Figure 5:
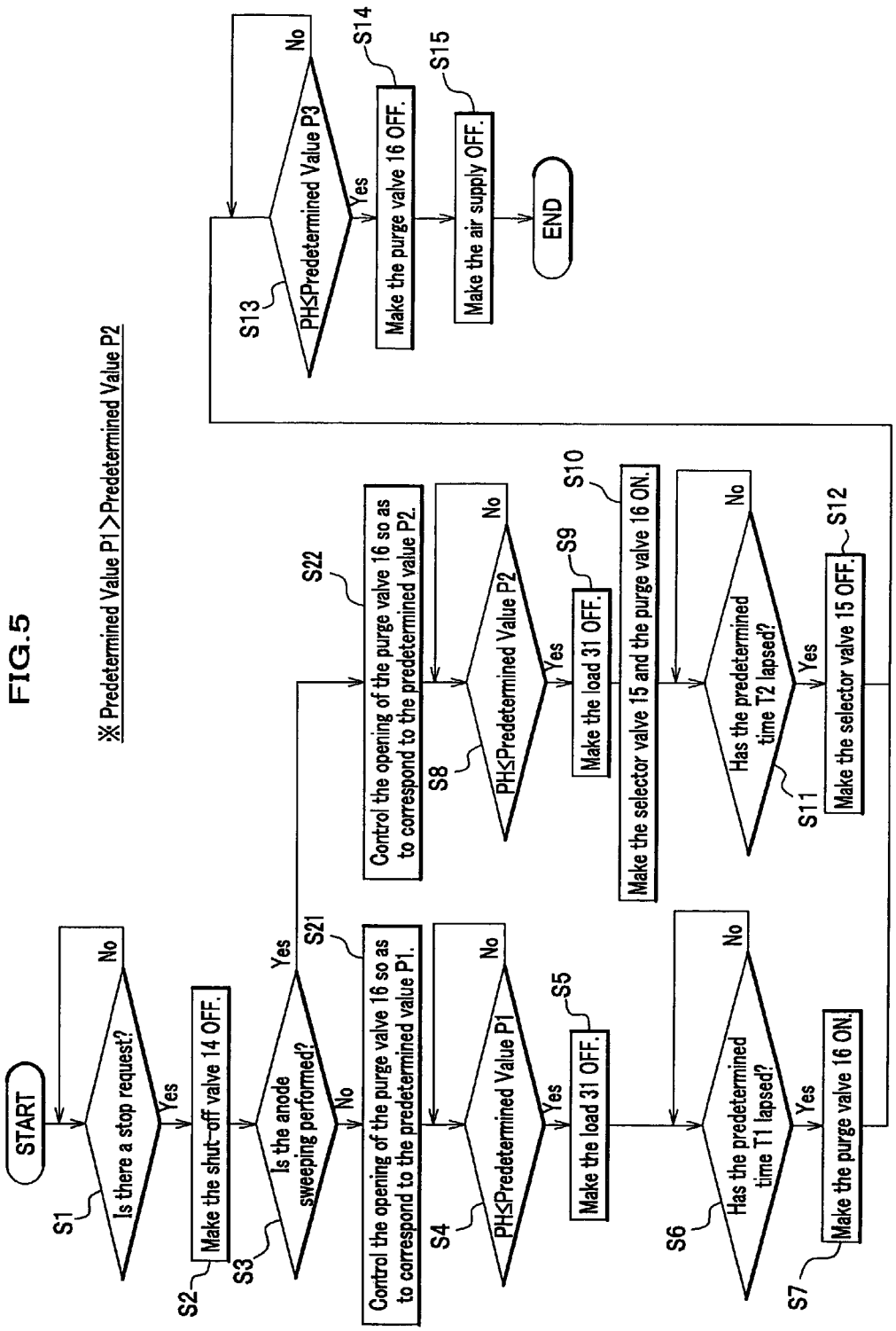
FIG. 5 is a flowchart showing a variation example of the first embodiment.

In the embodiment, although the pressure PH within the anode loop is designed to be reduced to any of the predetermined value P1 and the predetermined value P2 by continuing an operation of the fuel cell 13, the present invention is not limited thereto, the pressure PH within the anode loop may be rapidly reduced, for example, by continuing the operation of the fuel cell 13, adjusting an opening of the purge valve 16, and swiftly and continuously performing the opening/closing (hereinafter the operation is also referred to as "chopping") of the purge valve 16. To be more precise, as shown in FIG. 5, processings (steps 21 and 22) for opening the purge valve 16 by a predetermined amount may be added between the steps S3 and S4 and between the steps S3 and S8 in the flow of the embodiment (see FIG. 2) so that the opening of the purge valve 16 becomes an opening corresponding to any of the predetermined value P1 and the predetermined value P2. Meanwhile, the pressure PH within the anode loop may be designed to be reduced by performing nothing but any of the opening adjustment and chopping of the fuel cell 13 without continuing the operation of the fuel cell 13.

Although in the embodiment the shut-off valve 14 is completely closed after a stop request, the present invention is not limited thereto; the pressure PH within the anode loop can be reduced to any of the predetermined value P1 and the predetermined value P2, for example, also by adjusting an opening of the shut-off valve 14 and chopping the shut-off valve 14. To be more precise, as shown in FIG. 6, processings (steps 31 and 32) for closing the purge valve 16 by a predetermined amount may be added between the steps S3 and S4 and between the steps S3 and S8 instead of removing the step S2 in the flow of the embodiment (see FIG. 2) so that the opening of the shut-off valve 14 becomes an opening corresponding to any of the predetermined value P1 and the predetermined value P2. However, in this case, for example, it is necessary to completely close the shut-off valve 14 in addition to making the load 31 OFF, for example, in the steps S5 and S9 of FIG. 6

Although in the embodiment a remaining amount of a hydrogen gas consumed by the fuel cell 13 is accurately controlled by monitoring the pressure PH within the anode loop (see the steps S4 and S8 of FIG. 2), the present invention is not limited thereto, and a hydrogen amount consumed by the fuel cell 13 may be determined, for example, by a timer. To be more precise, it is available to substitute a processing of determining whether or not predetermined time has elapsed for the processing of the step S4 of the flow (see FIG. 2) in the embodiment and to substitute a processing of determining whether or not predetermined time longer than that of the step S4 has elapsed for the processing of the step S8.

Second Embodiment

Here will be described a second embodiment related to the present invention. Because a structure of the embodiment is a changed one of the fuel cell system 1 related to the first embodiment, a same symbol is added to a configuration component similar to the first embodiment, and a description thereof will be omitted.

Figure 7:
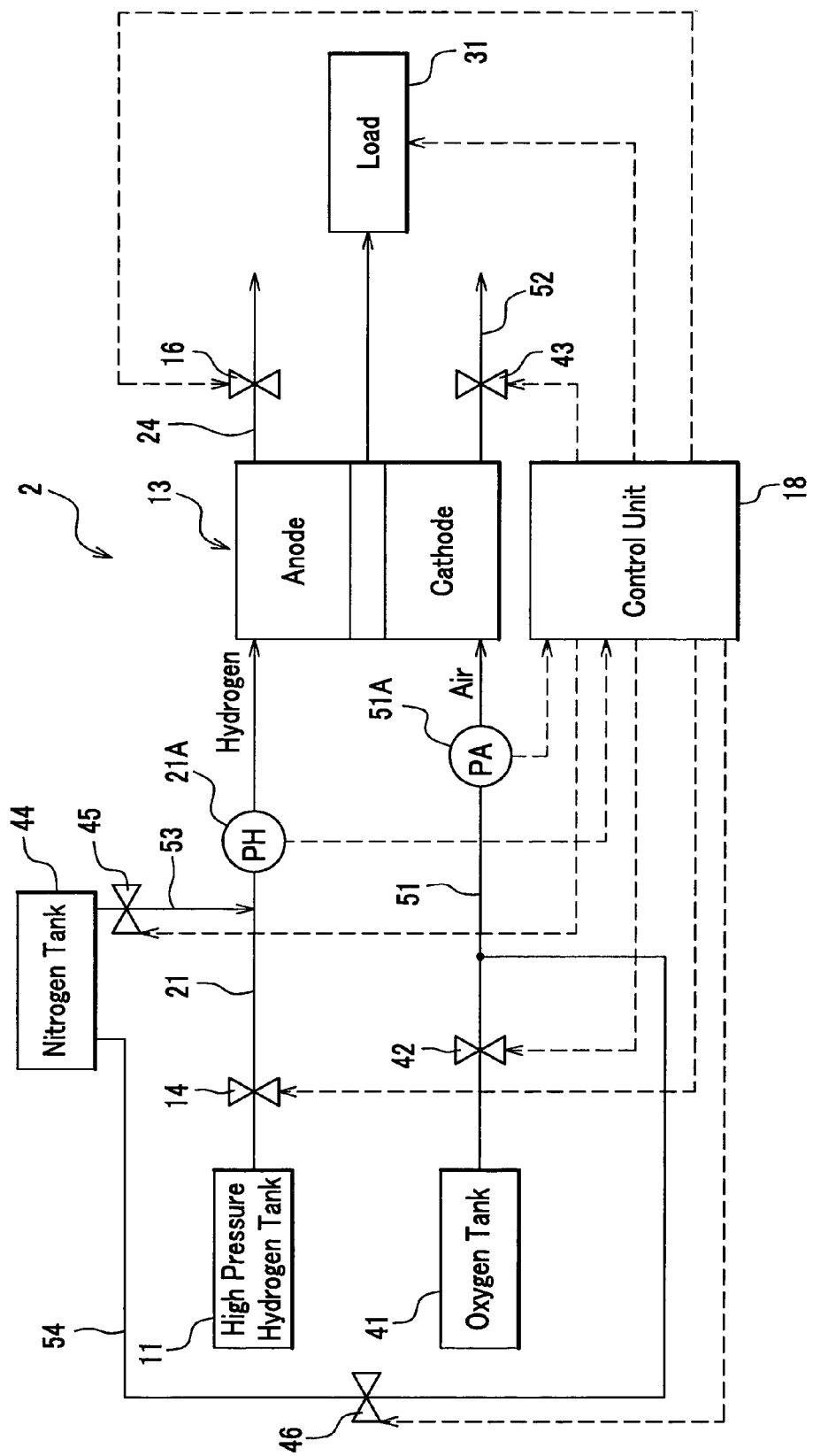
FIG. 7 is a configuration diagram showing a fuel cell system related to a second embodiment of the present invention.

As shown in FIG. 7, a fuel cell system 2 comprises an oxygen tank 41 filled with an oxygen gas instead of the compressor 12 in the first embodiment. In addition, at an oxygen supply passage (oxidizer gas flow passage) 51 for connecting the oxygen tank 41 and the fuel cell 13 are provided, from the oxygen tank 41 to the fuel cell 13 in order, a shut-off valve 42 and a pressure sensor 51A. Furthermore, to an outlet of a cathode side of the fuel cell 13 is connected an oxygen discharge passage (oxidizer gas flow passage) 52, and a purge valve 43 is provided at the oxygen discharge passage 52.

In addition, the fuel cell system 2 comprises a nitrogen tank 44 filled with a nitrogen gas (sweeping gas): to the nitrogen tank 44 are connected an anode side supply passage 53 connected to a downstream side of the shut-off valve 14 in the fuel gas supply passage 21 and a cathode side supply passage 54 connected to a downstream side of the shut-off valve 42 in the oxygen supply passage 51. And at the anode side supply passage 53 is provided a shut-off valve 45 for selecting a supply/stop of a nitrogen gas from the nitrogen tank 44 to the fuel gas supply passage 21; at the cathode side supply passage 54 is provided a shut-off valve 46 for selecting a supply/stop of a nitrogen gas from the nitrogen tank 44 to the oxygen supply passage 51.

In addition, a control unit 18 also has a function of appropriately opening/closing the shut-off valves 42, 45, and 46 and the purge valve 43 in addition to having functions substantially similar to those of the first embodiment. Meanwhile, for convenience, it is assumed that: in a description below the shut-off valve 14 is also called a hydrogen shut-off valve 14; the shut-off valve 42 also an oxygen shut-off valve 42; the shut-off valve 45 also an anode side nitrogen shut-off valve 45; and the shut-off valve 46 also a cathode side nitrogen shut-off valve 46. In addition, it is assumed that the purge valve 16 is also called a hydrogen purge valve 16; and the purge valve 43 also an oxygen purge valve 43.

Here will be described an operation of the control unit 18, referring to a flow shown in FIG. 8. Meanwhile, because the flow of FIG. 8 is a partially changed one of FIG. 2 described in the first embodiment, a same symbol is added to a same step, and a description thereof is omitted.

As shown in FIG. 8, the flow has new steps S41 to S46 in addition to having the steps S1, S3 to S6, S8, S9, S11, and S13 substantially similar to the flow of FIG. 2. Meanwhile, the steps S4, S8, and S13 in the second embodiment determine whether or not both detection values detected by two pressure sensors 21A and 51A have become not more than the predetermined values P1, P2, and P3, that is, both pressures within the anode loop and the cathode loop have become not more than the predetermined values P1, P2, and P3.

Subsequently, the new steps S41 to S46 will be described.

The step S41 is a processing of stopping a supply of a hydrogen gas and an oxygen gas to the fuel cell 13 by closing the hydrogen shut-off valve 14 and the oxygen shut-off valve 42 and is provided instead of the step S2 in the flow of FIG. 2.

The step S42 is a processing of sweeping the inside of the cathode loop by opening the cathode side hydrogen shut-off valve 46 and the oxygen purge valve 43 together and is provided between the steps S5 and S6.

The step S43 is a processing of discharging an impure gas within the anode loop and stopping a supply of a nitrogen gas into the cathode loop by opening the hydrogen purge valve 16 and closing the cathode side hydrogen shut-off valve 46 and is provided instead of the step S7 in the flow of FIG. 2.

The step S44 is a processing of sweeping the insides of the anode loop and the cathode loop by opening the shut-off valves 45 and 46 and the purge valves 16 and 43 and is provided instead of the step S10 in the flow of FIG. 2.

The step S45 is a processing of stopping a supply of a nitrogen gas into the anode loop and the cathode loop by closing the shut-off valves 45 and 46 and is provided instead of the step S12 in the flow of FIG. 2.

The step S46 is a processing of completing the stop of the system by closing the purge valves 16 and 43 and is provided instead of the steps S14 and S15 in the flow of FIG. 2.

Next will be described a stop method of the fuel cell system 2 related to the second embodiment, referring to FIGS. 8 and 7. Firstly will be described a stop method of not sweeping the inside of the anode loop.

As shown in FIG. 8, if a stop request is output by a driver's making an ignition switch OFF and the like, the shut-off valves 14 and 42 are closed in the step S41, and a supply of a hydrogen gas and an oxygen gas results in stopping. Subsequently, if in the step S3 the control unit 18 determines that it is not necessary to sweep the inside of the anode loop (No), in the step S4 the control unit 18 determines whether or not the pressure PH within the anode loop and a pressure PA within the cathode loop have become the predetermined value P1 together.

If in the step S4 the control unit 18 determines that the pressure PH and the pressure PA have become the predetermined value P1 (Yes), in the step S5 the control unit 18 makes the load 31 OFF, in the step S42 opens the cathode side hydrogen shut-off valve 46 and the oxygen purge valve 43 together, and thereby sweeping the inside of the cathode loop results in being started. And in the step S6 the control unit 18 determines that the predetermined time T1 has lapsed (sweeping the inside of the cathode loop is completed) (Yes), in the step S43 opens the hydrogen purge valve 16 and closes the cathode side hydrogen shut-off valve 46, and thereby an impure gas within the anode loop results in being discharged outside and a supply of a hydrogen gas to the inside of the cathode loop's being stopped. After then, if in the step S 13 the control unit 18 determines that both of the pressures PH and PA within the anode loop and the cathode loop have become not more than the predetermined value P3 (Yes), in the step S 46 the control unit 18 closes the purge valves 16 and 43 and the stop of the system results in being completed.

Subsequently, a stop method of sweeping the inside of the anode loop will be described.

If in the step S3 the control unit 18 determines that it is necessary to sweep the inside of the anode loop (Yes), in the step S8 the control unit 18 determines whether or not both of the pressures PH and PA within the anode loop and the cathode loop have become not more than the predetermined value P2 (value smaller than the predetermined value P1) (Yes). If in the step S8 the control unit 18 determines that both of the pressures PH and PA within the anode loop and the cathode loop have become not more than the predetermined value P2 (Yes), in the step S9 the control unit 18 makes the load 31 OFF, and in the step S44 opens the shut-off valves 45 and 46 and the purge valves 16 and 43, and thereby sweeping the inside of the anode loop and the cathode loop results in being started.

And in the step S11 the control unit 18 determines that the predetermined time T2 has lapsed (sweeping the inside of the anode loop and the cathode loop is completed) (Yes), in the step S45 closes the shut-off valves 45 and 46, and the supply of the nitrogen gas to the insides of the anode loop and the cathode loop results in being stopped. After then via the steps S13 and S46, the stop of the system results in being completed.

Thus in the second embodiment a following effect can be obtained:

Because the pressures within the anode loop and the cathode loop can be reduced by an operation of the fuel cell 13 before sweeping the insides of the anode loop and the cathode loop, wastes of a hydrogen gas and oxygen gas of fuel can be prevented.

Meanwhile, the present invention is not limited to the second embodiment and is performed in various embodiments. Although in the embodiment a nitrogen gas is used a sweeping gas, the invention is not limited thereto, and any inert gas is available.

What is claimed is:

1. A method of operating a fuel cell system to prevent a reaction between a fuel gas and a sweeping gas during a sweeping process, the method comprising the steps of:
during a normal power generation period of a fuel cell, passing said fuel gas through a fuel gas flow passage;
passing an oxidizer gas through an oxidizer gas flow passage;
generating power by a reaction of the fuel gas and the oxidizer gas;
supplying the generated power to a load connected to the fuel cell;
after receiving a stop request for shutting off said fuel cell system,
stopping a supply of the fuel gas to said fuel gas flow passage;
keeping the load connected to the fuel cell;
continuing an operation of the fuel cell to generate the power after the stop request is received so that the generated power is consumed in the load connected to the fuel cell;
determining whether to perform a sweeping for discharging at least water within said fuel gas flow passage, based on an outside temperature measured by a temperature sensor, when receiving said stop request;
reducing a pressure within said fuel gas flow passage to a first level lower than a second level when it is determined to perform the sweeping, and to the second level when it is determined not to perform the sweeping;
disconnecting the load from the fuel cell if the pressure within the fuel gas flow passage is reduced to the first level when it is determined to perform the sweeping, and to the second level when it is determined not to perform the sweeping; and
sweeping said fuel gas flow passage with a sweeping gas after the pressure within said fuel gas flow passage is reduced to the first level to prevent a membrane of the fuel cell from being deteriorated due to a reaction between the fuel gas and the sweeping gas within an anode loop of the fuel cell during the sweeping process so that the fuel cell is protected from the reaction between the fuel gas and the sweeping gas during the sweeping process, wherein the fuel gas is hydrogen and the sweeping gas is the oxidizer gas.

2. An operation method of a fuel cell system according to claim 1, the method further comprising the steps of:
detecting the pressure within said fuel gas flow passage; and
adjusting the pressure within said fuel gas flow passage, based on a signal from a pressure detection mechanism.

3. An operation method of a fuel cell system according to claim 1, wherein the pressure within said fuel gas flow passage is reduced to the first level or the second level when the stop request is received.

4. A method of operating a fuel cell system according to claim 1, further comprising the steps of:
determining whether the pressure within the fuel gas flow passage is reduced to a third level lower than the first and second levels and higher than an atmosphere pressure; and
upon determining that the pressure is higher than the third level, repeating the determination, and upon determining that the pressure is lower than or equal to the third level, stopping the system.

* * * * *